United States Patent
Smith et al.

(10) Patent No.: US 6,798,398 B2
(45) Date of Patent: Sep. 28, 2004

(54) COMPUTER MOUSE ACCESSORY

(75) Inventors: David Edwin Smith, Kettering (GB);
Bruce Ledwith, Sandbach (GB);
Michael Osborne, Sandbach (GB)

(73) Assignee: Hairy Mouse Limited, Somersham (GB)

( * ) Notice: Subject to any disclaimer, the term of this patent is extended or adjusted under 35 U.S.C. 154(b) by 129 days.

(21) Appl. No.: 10/076,841

(22) Filed: Feb. 15, 2002

(65) Prior Publication Data

US 2002/0126093 A1 Sep. 12, 2002

(30) Foreign Application Priority Data

Feb. 16, 2001 (GB) ............................................. 0103853

(51) Int. Cl.[7] .............................................. G09G 5/08
(52) U.S. Cl. ...................... 345/163; 345/156; 200/5 A; 200/5 R; 273/148 B; 463/37; 463/46; 463/47; 428/68
(58) Field of Search ................................ 345/156–167; 200/5 A, 5 R; 273/148 B; 463/37, 46, 47; 428/34.1, 68

(56) References Cited

U.S. PATENT DOCUMENTS

| | | | | |
|---|---|---|---|---|
| 5,245,146 A | * | 9/1993 | Florence | 200/333 |
| D369,154 S | * | 4/1996 | Powell | D14/403 |
| D400,194 S | * | 10/1998 | Leifer | D14/403 |
| 6,034,627 A | * | 3/2000 | Wei | 341/20 |
| 6,040,539 A | * | 3/2000 | Hiegel | 200/302.1 |
| 6,043,808 A | * | 3/2000 | Perry | 345/163 |
| D438,865 S | * | 3/2001 | Smith | D14/432 |
| D440,973 S | * | 4/2001 | Bush | D14/403 |
| D441,364 S | * | 5/2001 | Lawhon | D14/403 |
| D442,965 S | * | 5/2001 | Cecilia et al. | D14/440 |
| 6,256,015 B1 | * | 7/2001 | Adler | 345/163 |
| 6,373,467 B1 | * | 4/2002 | Slowinski et al. | 345/163 |
| 6,429,851 B1 | * | 8/2002 | Vaghefi et al. | 345/163 |

FOREIGN PATENT DOCUMENTS

| | | |
|---|---|---|
| DE | 295 13 538 U1 | 8/1995 |
| DE | 296 17 262 U1 | 10/1996 |
| DE | 297 00 169 U1 | 1/1997 |
| DE | 298 13 256 U1 | 7/1998 |
| DE | 298 19 990 U1 | 11/1998 |
| JP | 09140819 | 4/1997 |
| JP | 09169433 | 6/1997 |

* cited by examiner

*Primary Examiner*—Henry N. Tran
(74) *Attorney, Agent, or Firm*—Myron Greenspan, Esq.; Lackenbach Siegel LLP

(57) ABSTRACT

A computer mouse accessory comprises a cover which is configured to fit over a computer mouse in such a way that the pressure-sensitive switches associated with the computer mouse are operable through an opening in the cover.

11 Claims, 2 Drawing Sheets

COMPUTER MOUSE ACCESSORY

BACKGROUND OF THE INVENTION

The present invention relates to a novel computer mouse accessory.

A computer mouse is ergonomically designed so that a user's hand fits snugly around the device. The computer mouse may be considered as having a bottom surface which is in contact with a work surface such as a mouse pad when in use, and an upper surface which includes one or more pressure-sensitive switches for controlling computer operations when operated.

Various computer mouse covers are known from German utility model applications DE 298 19 990, DE 297 00 169, DE 296 17 262 and DE 298 13 256. However, the present applicant believes there is a need for an improved cover.

SUMMARY OF THE INVENTION

In accordance with a first aspect of the present invention, there is provided a computer mouse accessory comprising a cover for covering an upper surface of a computer mouse, the cover comprising first and second parts surrounding an opening in the cover, with the first part configured to be a loose fit around pressure-sensitive switching associated with the computer mouse and with the second part configured to be a snug fit around a part of the computer mouse spaced from pressure sensitive switching associated therewith, whereby in use pressure-sensitive switching associated with the computer mouse is operable through the opening in the cover.

The cover must not interfere with the essential functions of the computer mouse including the control of the cursor on the computer screen. For this reason, the cover may not extend over the bottom surface of the computer mouse. The opening in the cover and loose-fitting first part enable an operator to have unhindered access to the pressure-sensitive switches provided in the upper surface of the computer mouse. Thus, such switches may be controlled in a conventional way, removing any guesswork associated with pressing switches through a cover.

The cover may comprise means for readily attaching the second part of the cover to the computer mouse. The attaching means may be releasable. For example, the attaching means may comprise an adhesive which adheres to plastics material whilst being removable, perhaps by peeling away. The attaching means may include two layers, a first layer for attaching to the computer mouse, a second layer attached or for attaching to the cover, with the first and second layers adhering when pressed together. The first and second layers may include looped and burred regions for adhering in the manner of a Velcro fastening.

The cover may be substantially compliant, e.g. comprising a compliant fabric material. The first part may be self-supporting to the extent that the opening retains an open configuration even when the computer mouse is not in use. This may be achieved by reinforcing the first part e.g. by providing a seam or other stitching to encourage the first part to remain clear of the pressure-sensitive switching when in use. The first and second parts may overlap on opposite sides of the opening to help conceal the underlying computer mouse from view.

The cover may comprise a moisture-absorbent substance. A computer mouse is constructed from plastics material which is invariably hydrophobic and certainly not water-absorbent. Thus, perspiration generated during use by the user may accumulate on the upper surface of the computer mouse, giving rise to user discomfort. The presence of a moisture-absorbent substance in the cover, especially in the second part, would help to convey any perspiration away from the user's hand operating the computer mouse. Any absorbed moisture may simply be allowed to evaporate when the computer mouse was not in use.

The cover may include padding to provide a degree of through-thickness compressibility. The padding, which may be of resilient foam, may be greatest in a localised region in the second part spaced from pressure-sensitive switches associated with the computer mouse and located to cushion the palm (and more particularly the heel) of a user's hand. The greatest depth of padding may be about 10 mm when uncompressed by a user's hand, and the padding may compress by up to 50% during normal use. The plastics materials used for computer mouse housings are usually very rigid and thus are inclined to be unforgiving on the user's hand. In contrast, a padded or spongy cover may adopt a more user-friendly shape in the hand of the user. Furthermore, the padding may alter the posture of user's hand relative to the wrist during mouse operation, possible reducing the risk of being afflicted by repetitive strain injury (RSI) or carpal tunnel syndrome.

Tactile qualities of the cover are very important. The cover may include a furry outer layer. The furry outer layer may be stroked by the user which may give rise to a therapeutic effect not unlike stroking a pet cat or dog.

The cover may include protuberances shaped to resemble animal-like features selected from the group consisting of eyes, ears and a nose. The protuberances may be shaped such that the accessory resembles a mammalian mouse.

In accordance with the invention, there may be provided a computer mouse in combination with a computer mouse accessory as hereinbefore defined and described.

In accordance with a second aspect of the present invention, there is provided a therapeutic device comprising a cover for covering the upper surface of a computer mouse, the cover comprising first and second parts surrounding an opening in the cover, with the first part configured to be a loose fit around pressure-sensitive switching associated with the computer mouse and with the second part having means for attaching the cover to a computer mouse without interfering with essential functions of the computer mouse, whereby in use pressure-sensitive switches associated with the computer mouse are operable through the opening in the cover.

BRIEF DESCRIPTION OF THE DRAWINGS

An embodiment of the invention will now be described by way of example with reference to the accompanying drawings in which.

DESCRIPTION OF SPECIFIC EMBODIMENT

Figure 1:
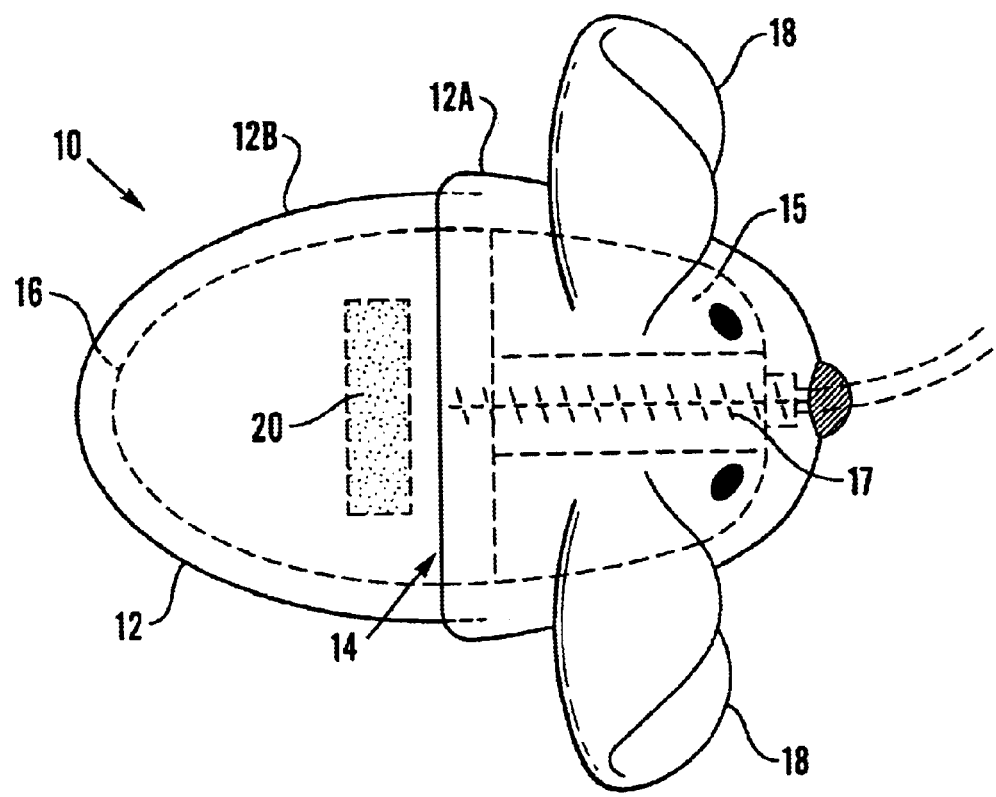
FIG. 1 shows a plan view of an accessory embodying the present invention.
Figure 2:
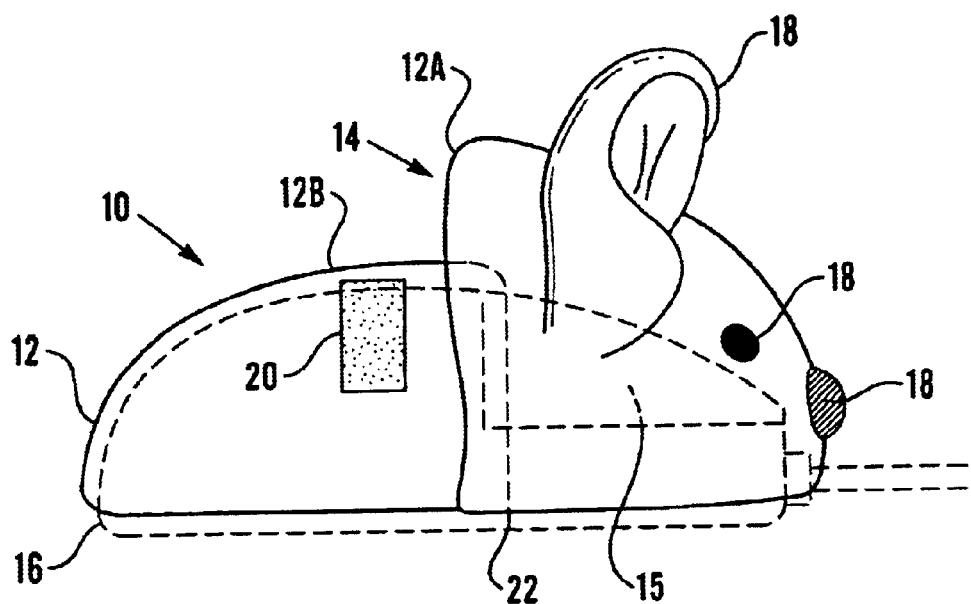
FIG. 2 is a side view of the accessory of FIG. 1.

FIGS. 1 and 2 show a computer mouse accessory (10) comprising a substantially compliant cover (12) comprising a first part (12A) and a second part (12B) which surround an opening (14) therebetween. The first part (12A) is configured to be a loose fit around pressure-sensitive switches (15)

associated with computer mouse (16) which is shown in phantom lines. The second part (12B) is configured to be a snug fit around a part of the computer mouse (16) spaced from the switches (15), and has an adhesive strip (20) for attachment to the computer mouse (16). The opening (14) allows an operator to insert fingers into the space between the first part (12A) and the computer mouse (16), enabling pressure switches (15) to be used in a conventional, direct way.

The opening (14) is maintained in an open configuration by known ways of stiffening the first part (12A) of the cover (12). For example, by providing a seam (17) in the first part (12A) of cover (12), sufficient resilience may be introduced to prevent the first part (12A) collapsing down onto the computer mouse (16). Alternatively, or in addition, the mouth of the opening (14) may be reinforced by webbing or the like. The first part (12A) overlaps the second part (12B) adjacent the opening, thereby helping to conceal the opening (14) when the cover (12) is viewed from above.

The cover (12) comprises a textile fabric layer for improved tactile qualities, and for absorbing perspiration from the user's hand. The first part (12A) of cover (12) includes protuberances (18) which are shaped and positioned to resemble mammalian mouse features such as a nose, eyes and ears. The first and second parts (12A, 12B) overlap on opposite sides of the opening (16), helping to conceal the computer mouse from view through the opening (14).

The adhesive strip (20) on the inside surface of the cover (12) is double-sided, with one side of the adhesive strip attached to the cover (12). The other side of the adhesive strip (20) is for attachment to the computer mouse (16) and prior to use is protected by a peelable layer. When fixing into position, the peelable layer is removed and the cover (12) orientated over the computer mouse (16) such that face-like protuberances (18) point away from the user. The sides of the cover (12) do not project beyond bottom edge (22) of the computer mouse (16).

In use, the cover (12) is comfortable to hold, having a pleasing texture for the user and being able to absorb perspiration from the user's hand. User comfort may be increased by padding (not shown) which comprises resilient foam. The padding may be concentrated in a region which in use will provide cushioning for the palm region (and especially the "heel" region associated with the ball of the thumb) of the user's hand.

Figure 3:
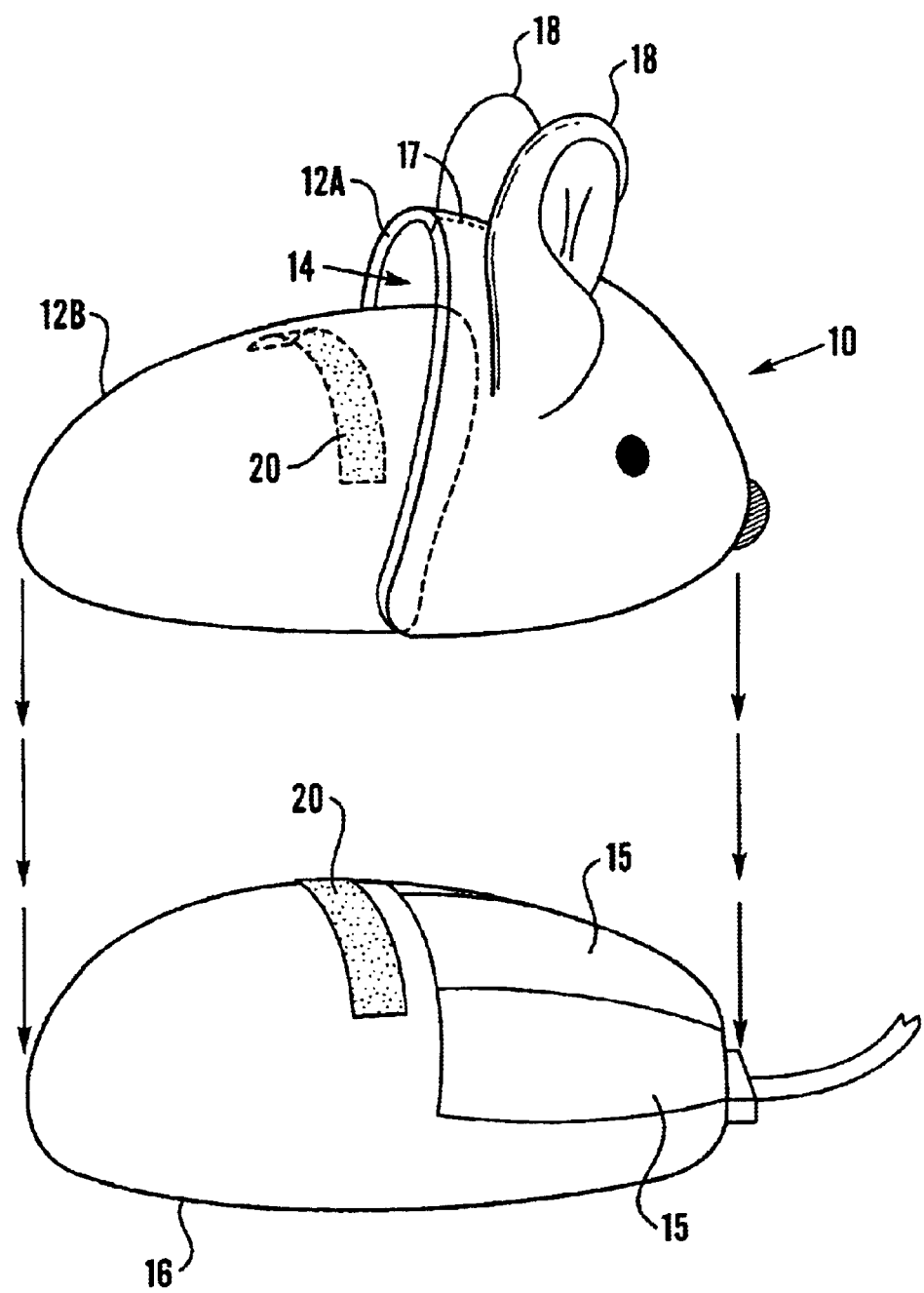
FIG. 3 is an exploded schematic view showing how the accessory of FIG. 1 fits over a computer mouse.

FIG. 3 shows an exploded view of the computer mouse accessory (10) and a computer mouse (16).

What is claimed is:

1. A computer mouse accessory comprising a cover for covering an upper surface of a computer mouse, the cover comprising first and second parts surrounding an opening in the cover, with the first part configured to be a loose fit around pressure-sensitive switching associated with a front part of the computer mouse and with the second part configured to be a snug fit around a rear part of the computer mouse spaced from pressure-sensitive switches associated therewith without interfering with essential functions of the computer mouse, the opening in the cover extending substantially from one lateral side of the cover to another lateral side of the cover, with the first part substantially extending above the second part so that the opening in the cover is substantially rearward-facing, whereby in use pressure-sensitive switches associated with the computer mouse are operable through the opening in the cover.

2. A computer mouse accessory according to claim 1, further comprising means for readily attaching the second part of the cover to the computer mouse.

3. A computer mouse accessory according to claim 2, in which the attaching means comprises two layers, with a first layer for attaching to the computer mouse and with a second layer attached to or for attaching to the cover, the first and second layers adhering to each other when pressed into contact.

4. A computer mouse accessory according to claim 1, in which the cover comprises a moisture-absorbent substance.

5. A computer mouse accessory according to claim 1, in which the first part is self-supporting to the extent that the opening retains an open configuration.

6. A computer mouse accessory according to claim 5, in which the first part is reinforced to encourage clearance of the pressure-sensitive switching.

7. A computer mouse accessory according to claim 1, in which the cover is provided with a furry outer layer.

8. A computer mouse accessory according to claim 7, in which the cover includes at least one protuberance shaped to resemble an animal-like feature selected from the group consisting of an eye, an ear and a nose.

9. A computer mouse accessory according to claim 8, in which the protuberances resemble a mammalian mouse.

10. A computer mouse in combination with a computer mouse accessory according to claim 1, with the opening providing user access to pressure-sensitive switching associated with the computer mouse.

11. A therapeutic device for use in combination with a computer mouse, comprising a cover for covering an upper surface of the computer mouse, the cover comprising first and second parts surrounding an opening in the cover, with the first part configured to be a loose fit around pressure-sensitive switching associated with a front part of the computer mouse and with the second part configured to be a snug fit around a rear part of the computer mouse spaced from pressure-sensitive switches associated therewith without interfering with essential functions of the computer mouse, the opening in the cover extending substantially from one lateral side of the cover to another lateral side of the cover, with the first part substantially extending above the second part so that the opening in the cover is substantially rearward-facing, whereby in use pressure-sensitive switches associated with the computer mouse are operable through the opening in the cover.

* * * * *